(12) United States Patent
Li et al.

(10) Patent No.: US 12,445,574 B2
(45) Date of Patent: Oct. 14, 2025

(54) IDENTIFICATION OF PERSONS OF INTEREST IN MEETINGS

(71) Applicant: HEWLETT-PACKARD DEVELOPMENT COMPANY, L.P., Spring, TX (US)

(72) Inventors: Pei Hsuan Li, Spring, TX (US); Rose Hedderman, Spring, TX (US); Yu Chun Huang, Spring, TX (US); Sarah Shiraz, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 310 days.

(21) Appl. No.: 17/975,417

(22) Filed: Oct. 27, 2022

(65) Prior Publication Data

US 2024/0146874 A1  May 2, 2024

(51) Int. Cl.
| | | |
|---|---|---|
| *H04N 7/15* | (2006.01) | |
| *G06V 10/70* | (2022.01) | |
| *G06V 40/16* | (2022.01) | |
| *G10L 17/02* | (2013.01) | |
| *H04L 12/18* | (2006.01) | |

(52) U.S. Cl.
CPC ............. *H04N 7/152* (2013.01); *G06V 10/70* (2022.01); *G06V 40/171* (2022.01); *G06V 40/172* (2022.01); *G10L 17/02* (2013.01); *H04L 12/1822* (2013.01)

(58) Field of Classification Search
CPC .... H04N 7/152; H04N 7/147; H04N 5/23219; H04N 21/4223; H04N 21/44218; H04N 7/15; G06V 10/70; G06V 40/171; G06V 40/172; G06V 40/168; G06V 40/16; G06V 10/764; G06V 40/161; G06V 40/165; G06V 40/167; G06V 40/173; G10L 17/02; G10L 25/57; G10L 15/24; G10L 15/25; H04L 12/1822; H04L 12/1818; H04L 12/18; H04L 65/403; H04L 12/1827; G06K 9/00221–00389; G06T 2207/30196–302011; G06F 17/30793; A61B 5/1176

See application file for complete search history.

(56) References Cited

U.S. PATENT DOCUMENTS

| | | | | |
|---|---|---|---|---|
| 4,449,189 A * | 5/1984 | Feix | ....................... | G06V 40/20 382/118 |
| 8,125,509 B2 * | 2/2012 | Kenoyer | ................. | H04N 7/147 348/14.09 |
| 8,350,891 B2 * | 1/2013 | Khot | ......................... | H04N 7/15 348/14.08 |
| 9,922,048 B1 * | 3/2018 | Milliorn | ............... | G06V 40/171 |
| 10,904,485 B1 * | 1/2021 | Childress, Jr. | ........... | H04N 7/15 |
| 11,228,625 B1 | 1/2022 | Libin | | |
| 2007/0140532 A1 * | 6/2007 | Goffin | ...................... | H04N 7/14 382/118 |

(Continued)

*Primary Examiner* — Yogeshkumar Patel
(74) *Attorney, Agent, or Firm* — Quarles & Brady LLP

(57) ABSTRACT

In examples, an electronic device comprises a processor to receive an image of a meeting space including a person; identify facial features of the person; determine whether the person is of interest to a meeting based on the identification; and cause a change in a manner in which a video stream of the person is displayed on a graphical user interface (GUI) based on the determination.

22 Claims, 7 Drawing Sheets

(56) References Cited

U.S. PATENT DOCUMENTS

| | | | |
|---|---|---|---|
| 2010/0149305 A1* | 6/2010 | Catchpole | G06V 40/172 |
| | | | 348/E7.083 |
| 2013/0294594 A1 | 11/2013 | Chervets et al. | |
| 2015/0189233 A1 | 7/2015 | Carpenter et al. | |
| 2015/0310260 A1* | 10/2015 | Summers | G06F 18/28 |
| | | | 382/103 |
| 2019/0007623 A1 | 1/2019 | Wang et al. | |
| 2019/0108492 A1* | 4/2019 | Nelson | G06F 40/186 |
| 2019/0222892 A1* | 7/2019 | Faulkner | H04N 21/4314 |
| 2021/0399911 A1* | 12/2021 | Jorasch | H04L 12/1818 |
| 2021/0400142 A1* | 12/2021 | Jorasch | H04L 65/1069 |
| 2023/0080660 A1* | 3/2023 | Miletic | G10L 15/063 |
| | | | 382/103 |
| 2023/0206621 A1* | 6/2023 | Ayanoglu | H04L 65/611 |
| | | | 382/190 |

* cited by examiner

IDENTIFICATION OF PERSONS OF INTEREST IN MEETINGS

BACKGROUND

Video conferencing technology is widely used to conduct meetings, such as business meetings. Various persons may participate in such meetings. Some such persons may be of particular interest to one or more meeting attendees.

BRIEF DESCRIPTION OF THE DRAWINGS

Various examples will be described below referring to the following figures.

DETAILED DESCRIPTION

Video conferencing software may facilitate organizational meetings. A graphical user interface (GUI) of such video conferencing software may provide several video panes, with each pane displaying a video stream of a different meeting attendee. Some attendees may wish for their GUI video panes to show video streams of persons of interest (POIs) (e.g., leaders such as managers and executives) in the organization, rather than video streams of non-POIs. For example, an attendee may wish for her GUI video panes to show her business unit's leader and C-suite executives, rather than employees who have a lower ranking than her. In some cases, an attendee may wish for her GUI video panes to only show POIs and to exclude non-POIs, thereby minimizing distractions. In some cases, an attendee may wish for her GUI video panes to show POIs with greater priority than non-POIs.

This disclosure describes various examples of electronic devices that are to automatically identify POIs participating in an organizational video meeting and to use such identifications to configure an attendee's GUI according to preferences identified by the attendee. An example electronic device may be to receive an image of a meeting space having a person and compare a face of the person to a database to determine whether the person is a POI (e.g., leader) in an organization. The electronic device may be to, responsive to the comparison indicating the person is a leader in the organization, cause a change in a manner in which a video stream of the person is displayed on a graphical user interface (GUI). The electronic device may be to, responsive to the comparison failing to indicate the person is a POI in the organization: use a machine learning technique on the image to identify facial features of the person signifying traits relating to POIs (hereinafter, "POI traits") (e.g., leadership traits); determine whether the person is a POI based on the identification; and cause a change in the manner in which the video stream of the person is displayed on the graphical user interface.

Figure 1:
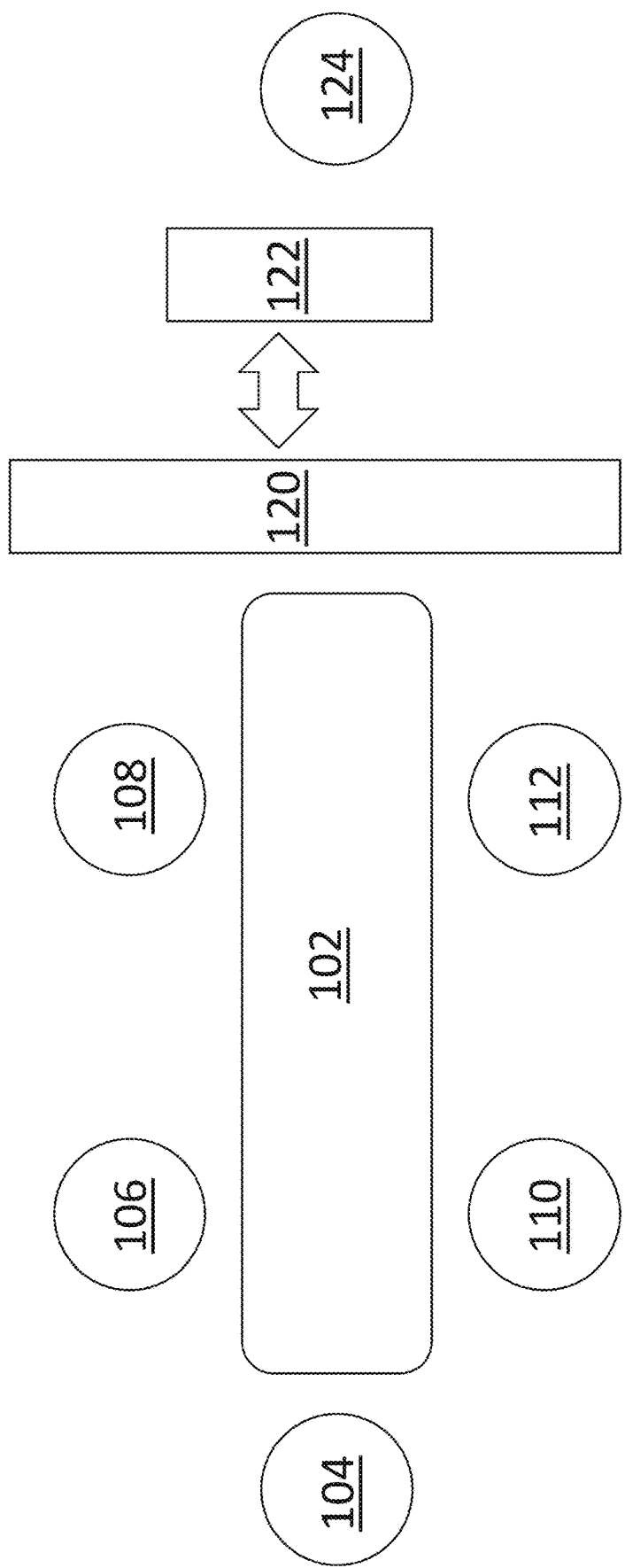
FIG. 1 is a schematic diagram of a meeting being captured and presented using video conferencing technology in accordance with examples.

FIG. 1 is a schematic diagram of a meeting being captured and presented using video conferencing technology in accordance with examples. The meeting includes a conference table 102 around which persons 104, 106, 108, 110, and 112 are seated. In this example, person 104 is assumed to be a POI, and the remaining persons are assumed to be non-POIs. The scope of this disclosure is not limited to any particular number or seating arrangement of POIs. Further, this disclosure assumes that the POIs and non-POIs are physically co-located in the same meeting room, but the techniques described herein also apply to meetings that are geographically distributed and conducted in part or whole via video conferencing technology.

An electronic device 120 includes a camera that is trained on the persons seated at the conference table 102. The electronic device 120 continuously captures audio and video streams of the meeting. The electronic device 120 may store the audio and video data locally, for example, in storage of the electronic device 120. In examples, the electronic device 120 communicates with a remotely located electronic device 122, such as a personal computer or smartphone used by person 124. Such communication may occur over a network of any suitable type, such as the Internet, a local area network, or using BLUETOOTH® protocols. The electronic device 122 may display the audio and video streams to the person 124, for example by way of a GUI on a display of the electronic device 122 and speakers of the electronic device 122. In examples, the electronic device 122 processes the audio and video streams received from the electronic device 120 to determine which of the persons 104, 106, 108, 110, and/or 112 is a POI, if any. The electronic device 122 then configures the GUI based on the determination. The electronic device 122 may distinguish POIs from non-POIs based on various factors, including, for example, whether an image of a person matches images in a database of POIs; the results of a machine learning technique applied to identify which persons in the meeting have facial characteristics, mannerisms, and/or interactions with other persons typical of POI status and which do not; frequency of speech by each person; and the results of a machine learning technique applied to identify which persons have speech patterns typical of POIs and which do not. In examples, the electronic device 122 may produce a numerical score for each such factor, apply weights to the factors, combine the weighted factors to produce a final score, and compare the final score to a threshold to determine whether a particular person is a POI. The manner in which the electronic device 122 performs such actions is described below with reference to FIGS. 2-7.

Figure 2:
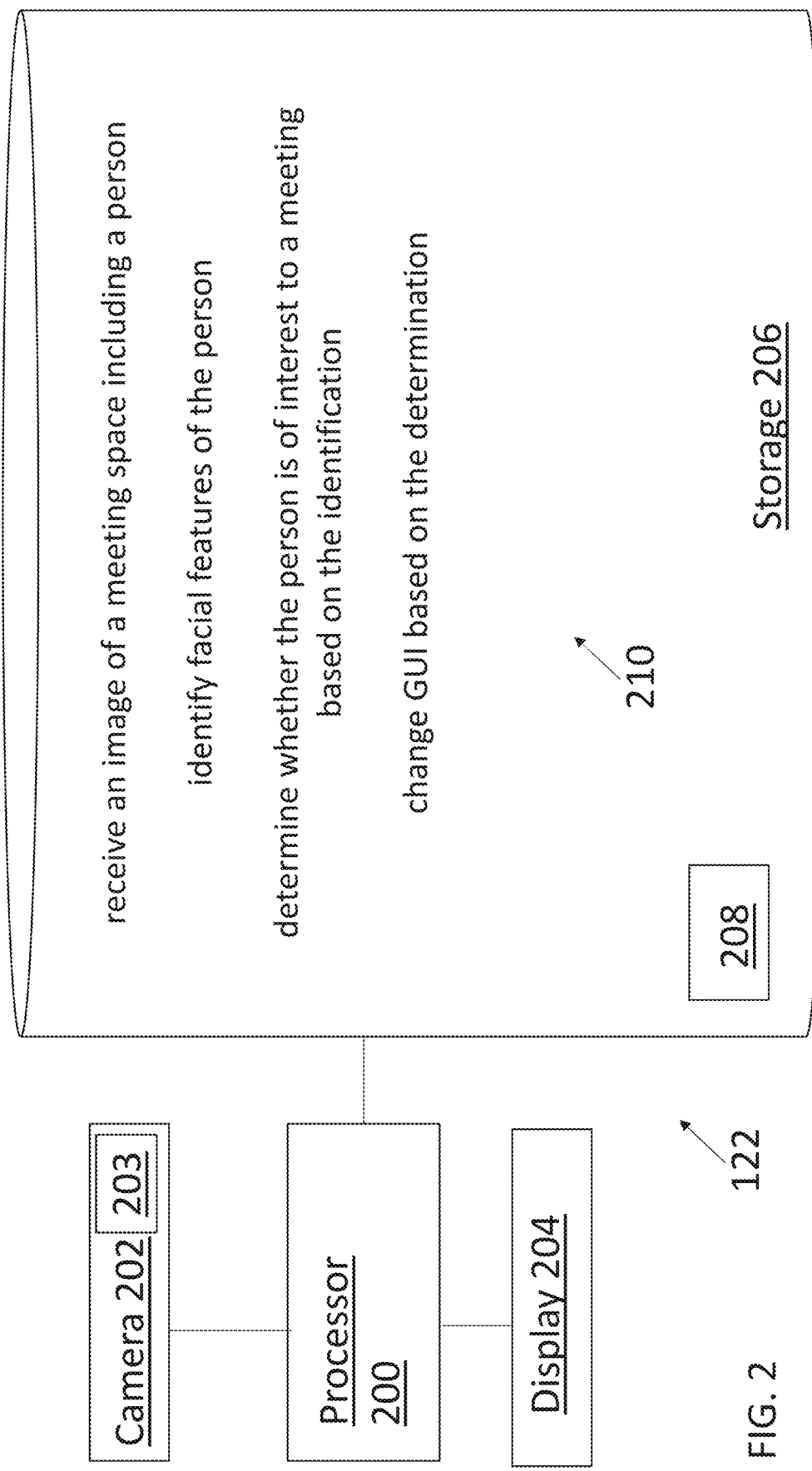
FIGS. 2-4 are block diagrams of electronic devices for identifying persons of interest in a meeting and presenting video streams based on the identifications, in accordance with examples.
Figure 3:
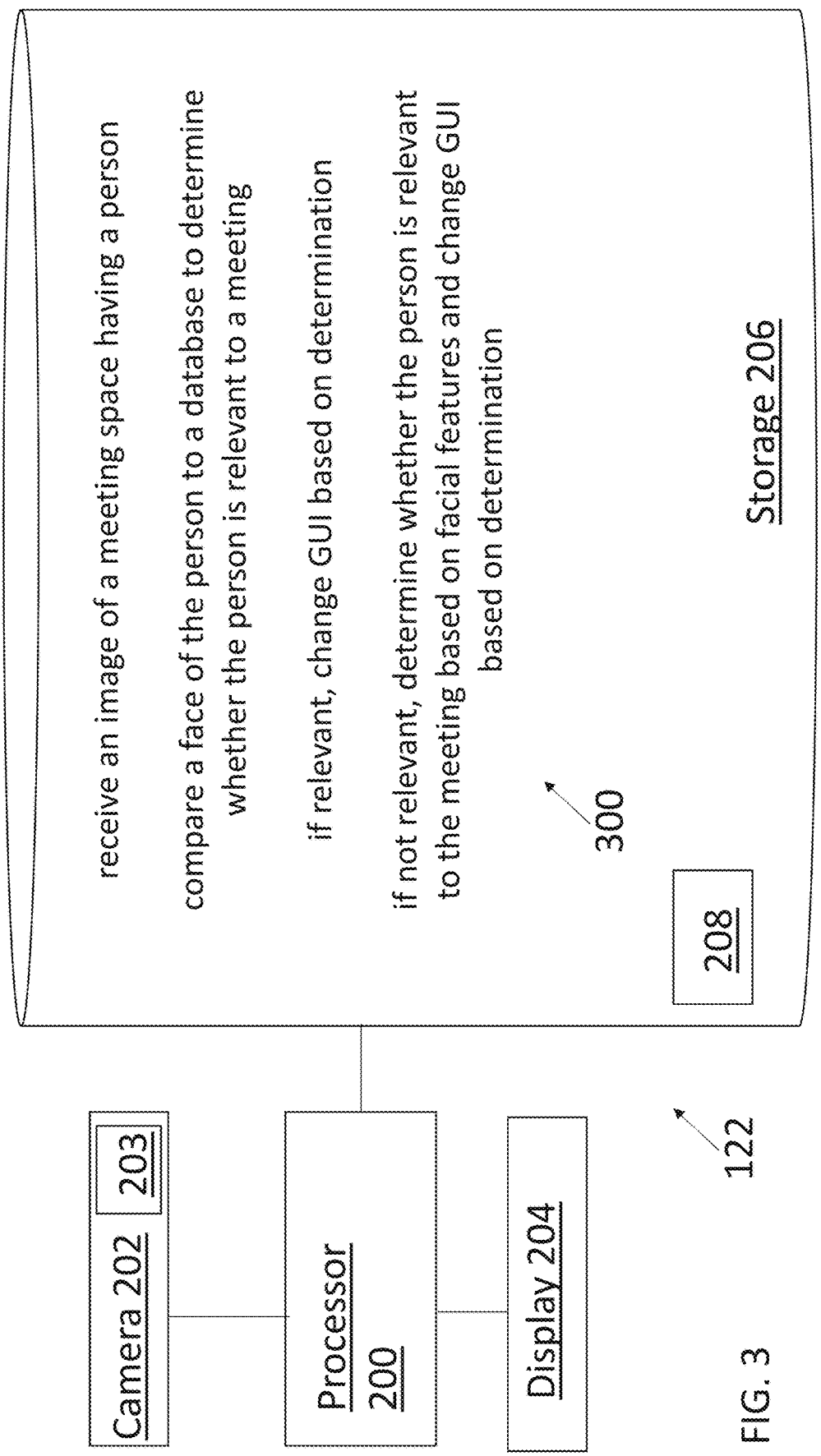
Figure 4:
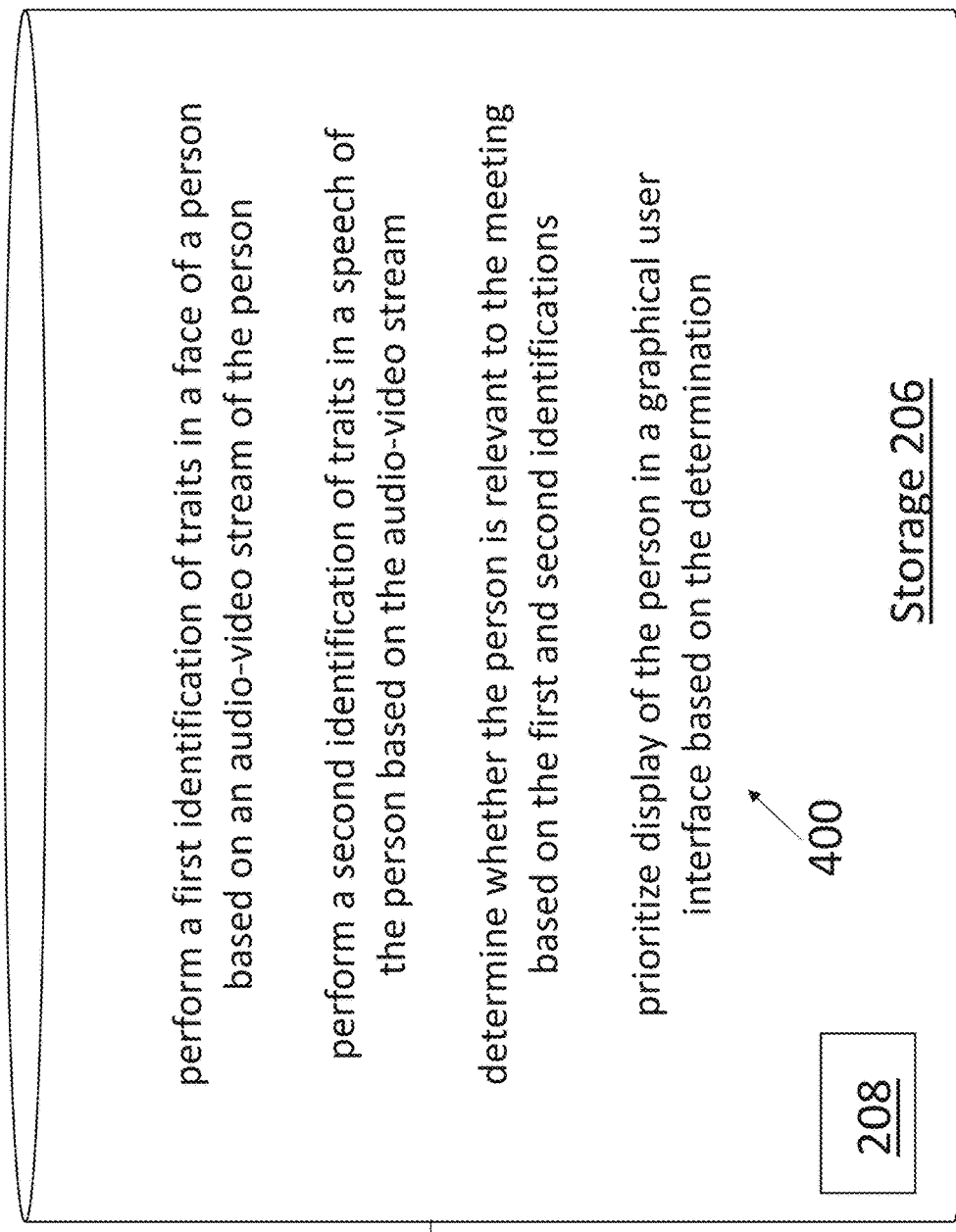

FIGS. 2-4 are block diagrams of electronic devices 122 for identifying persons of interest in a meeting and presenting video streams based on the identifications, in accordance with examples. The electronic device 122 shown in each of FIGS. 2-4 is similar or identical except for the executable code with which the electronic device 122 is programmed. Referring now to FIG. 2, the electronic device 122 includes a processor 200 coupled to a camera 202, a display 204, and storage 206. The camera 202 is to capture images, including individual images and video streams. For example, the camera 202 may be a webcam. The camera 202 includes an integrated microphone 203 to capture audio streams, although in examples, the camera 202 is a standalone camera separate from the camera 202. The display 204 is to display a GUI. For example, the GUI may include multiple video panes, each populated with a different video stream. For example, if the person 124 (FIG. 1) who is using the electronic device 122 is in a video meeting with ten other attendees, then the GUI on display 204 may include ten video panes, each populated with a different video stream for each of the ten other attendees. In examples, the GUI may show the video panes in an array, although the scope of disclosure is not limited as such. The electronic device 122 may include a speaker (not expressly shown) to output audio streams to the person 124.

The storage 206 may be any suitable type of storage, such as random access memory (RAM) or read-only memory (ROM). The storage 206 stores a database 208 that may include multiple images of persons. Some or all of the image files in the database 208 may include metadata that describes the person (e.g., biographical information, such as title within a company, educational background, etc.), including information that may be useful to determine whether that person is a POI.

The storage 206 also stores executable code 210. When executed by the processor 200, the executable code 210 causes the processor 200 to perform some or all of the actions attributed herein to the processor 200 and/or to the electronic device 122. In examples, the executable code 210 causes the processor 200 to receive an image of a meeting space including a person. For example, the processor 200 may receive an image of the meeting space shown in FIG. 1 via the network connection between electronic devices 120 and 122. In examples, the image is part of a video stream.

The processor 200 may identify facial features of the person in the image and determine whether the person is a POI based on the identification of facial features. Certain types of POIs may have specific facial features in common. For example, leaders may generally be taller than non-leaders. Leaders may have more prominent chins or noses than non-leaders. Leaders may be more likely to wear expensive jewelry or have dimples. A training data set populated with thousands (or more) of images of leaders may enable a machine learning algorithm to distinguish leaders from non-leaders based on such facial features. Other types of POIs may have other facial features in common, and machine learning algorithms may be similarly trained to identify such POIs based on facial features.

In addition or, or instead of, the machine-learning based analysis of facial features, video streams may be analyzed using machine-learning techniques to identify physical movements of a person or other attendees indicating the person is a POI. For example, if movements of the person's mouth indicating speech repeatedly coincide with other attendees nodding their heads, that person may be more likely to be a POI such as a leader. Similarly, if the person shakes their head as other attendees are speaking, the person may be more likely to be a POI, such as a leader. In general, static and dynamic visual information may be analyzed using machine learning techniques as described herein to identify traits specific to a target type of POI. For leaders, such traits may include, e.g., trustworthiness, competence, dominance, etc.

The processor 200 may change the GUI based on the determination. For example, the processor 200 may arrange the video panes in the GUI to prioritize display of POI video panes and to de-prioritize display of non-POI video panes. The processor 200 may arrange the video panes to prioritize display of non-POI video panes and to de-prioritize display of POI video panes. The processor 200 may display only POI video panes and omit non-POI video panes. The processor 200 may arrange the GUI to display a speaking person's video pane most prominently, regardless of POI status, and then to prioritize POI video panes after the speaker. In such a case, if the speaking person is a non-POI and stops speaking and then a POI begins to speak, the POI is displayed most prominently, and the POI video panes are prioritized after the POI speaker, and a next most relevant person, even if not a POI, is prioritized after the POIs.

Figure 5:
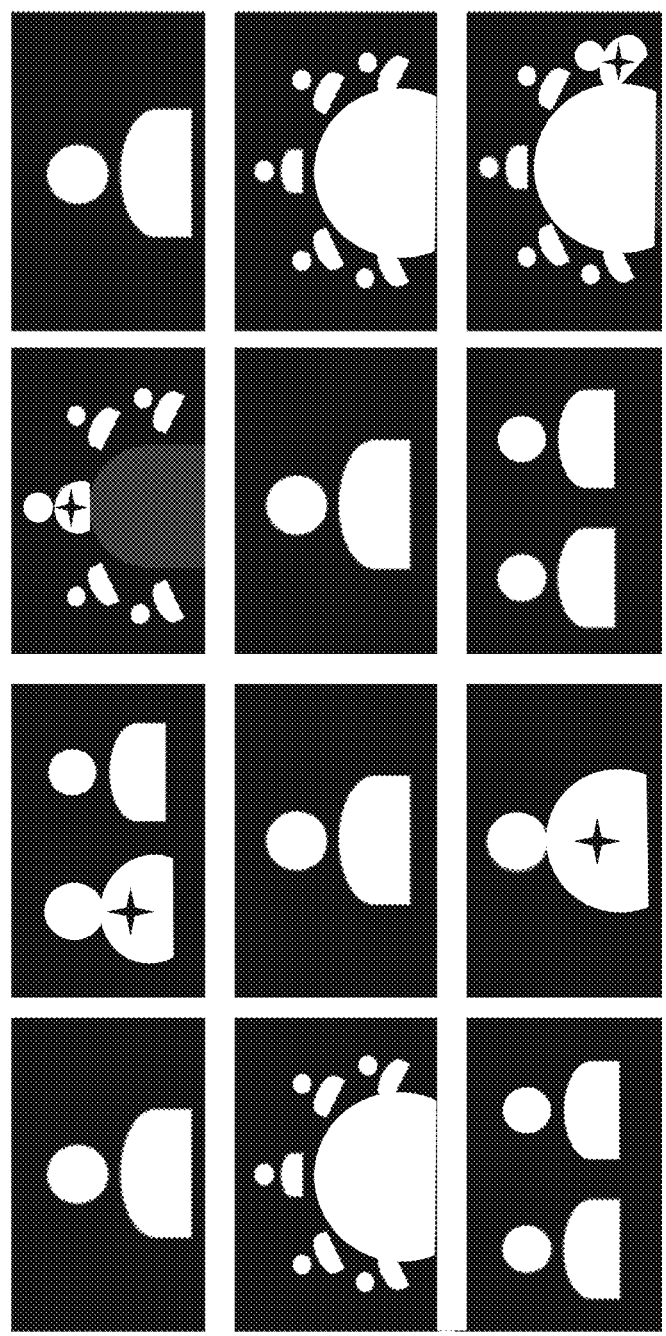
FIGS. 5-7 are schematic diagrams of graphical user interfaces (GUIs) including multiple video streams arranged based on the identification of persons of interest, in accordance with examples.
Figure 6:
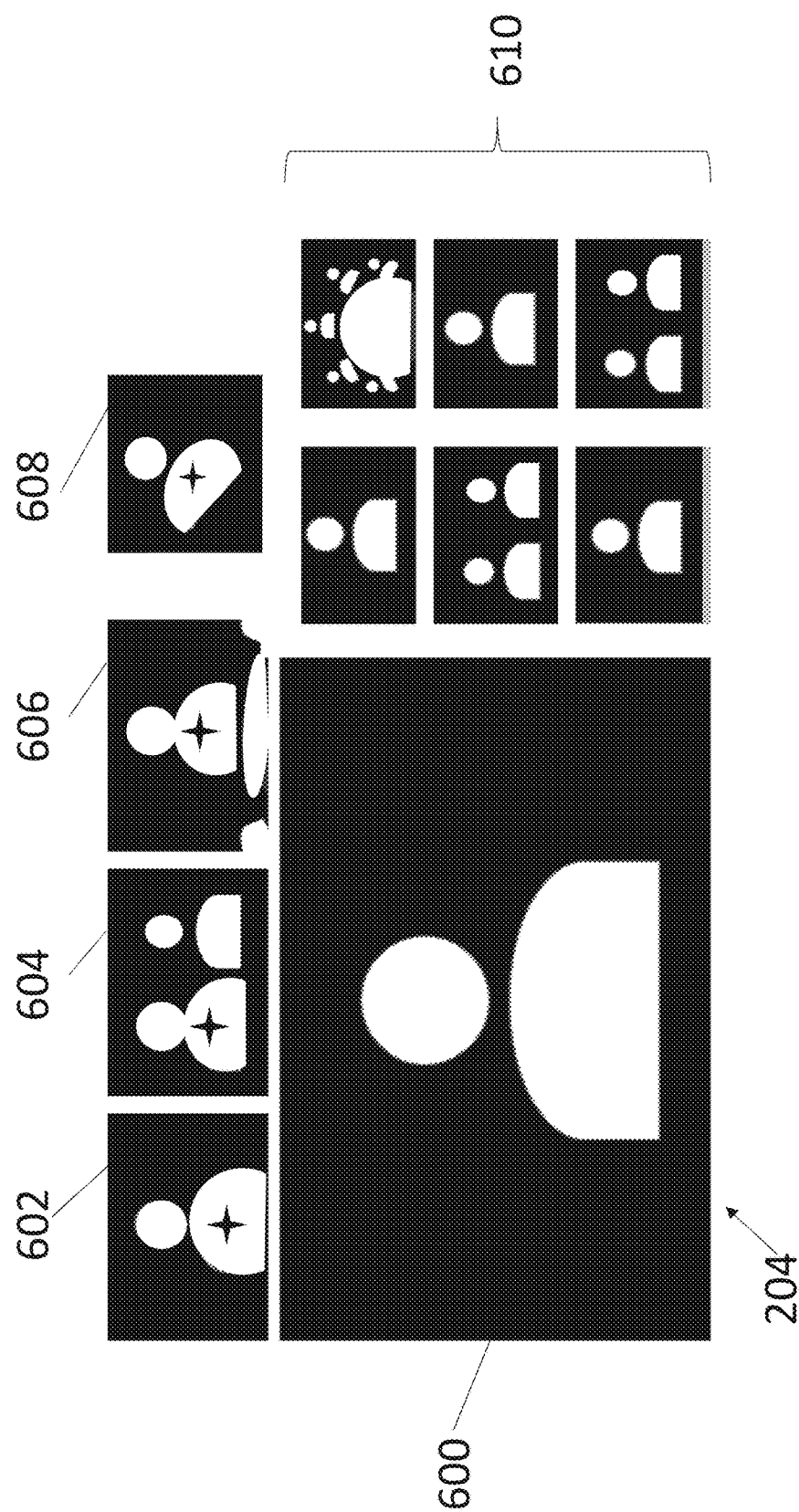
Figure 7:
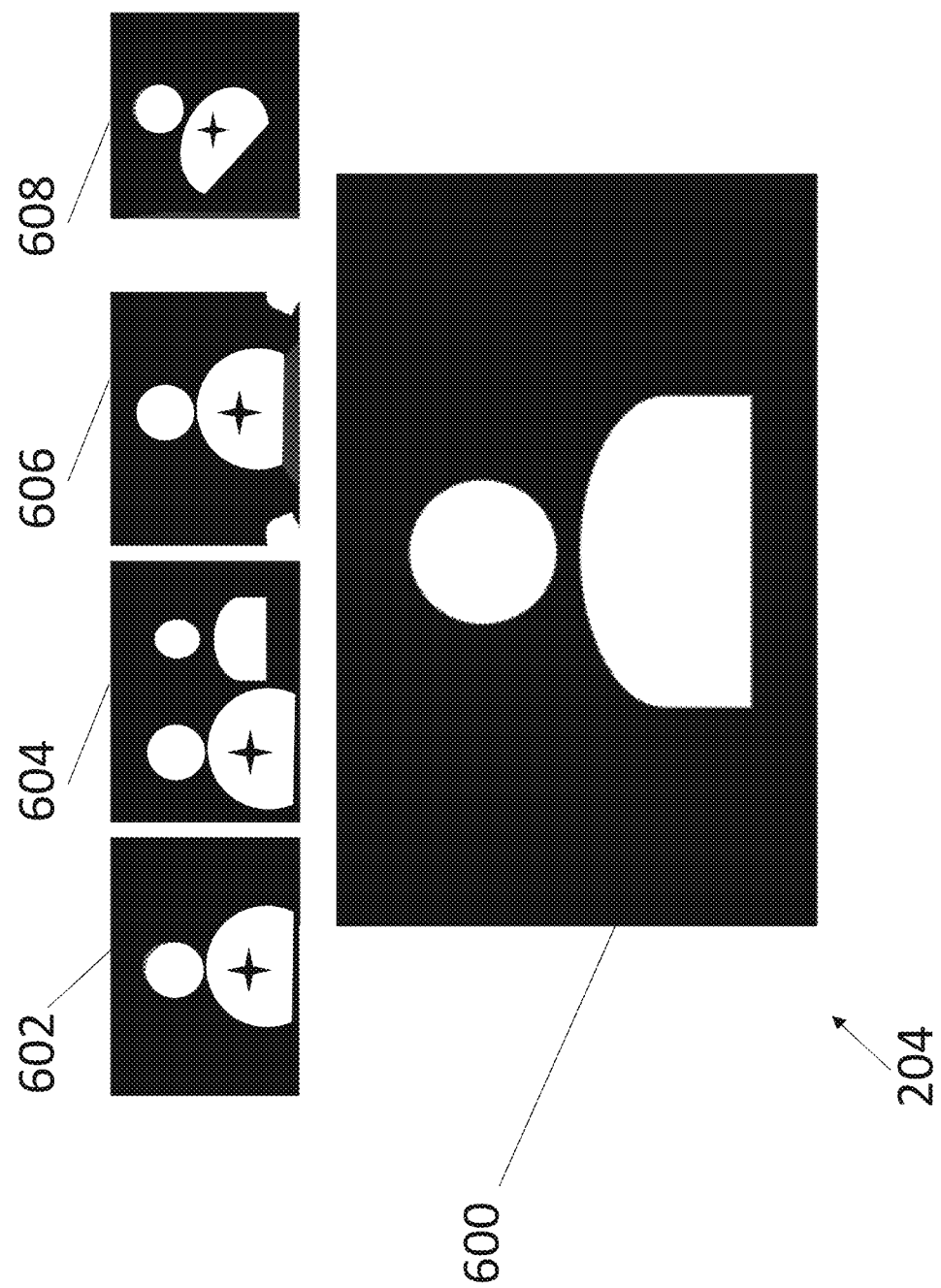

Turning briefly to FIGS. 5-7, which show example GUI video pane arrangements, the GUI of display 204 may be arranged as shown in FIG. 5 prior to application of the techniques described herein. In FIG. 5, POIs (indicated by a dark star) and non-POIs (lacking a star) are shown on the GUI without any discernible priority given to POIs. For example, the GUI may appear as shown in FIG. 5 at the beginning of a video conference. As the processor 200 applies the techniques described herein, the processor 200 may adjust the GUI of display 204 to appear as shown in the example of FIG. 6. The example GUI in FIG. 6 shows a speaker most prominently in video pane 600. After the speaker, the next most prominently displayed attendees are POIs in video panes 602, 604, 606, and 608. A non-POI may be included in one of the prioritized video panes, such as in video pane 604, as long as a POI is also included in that video pane. The remaining video streams are displayed in de-prioritized video panes 610, as shown. In the event the non-POI speaker shown in video pane 600 stops speaking and a POI (e.g., the POI shown in video pane 608) begins speaking, the video stream for the non-POI speaker may be relegated to one of the de-prioritized video panes 610, the video stream for the new POI speaker may be provided to the video pane 600, and the video stream for the next most relevant non-POI attendee from among the de-prioritized video panes 610 is shown in video pane 608 to replace the video stream of the POI whose video stream was moved to video pane 600. After the POI in video pane 600 ceases speaking, the video stream for that POI may be returned to video pane 608, and the non-POI whose video stream was provided in video pane 608 may again be relegated to the de-prioritized video panes 610. In some examples, only POIs and the speaker are shown in the GUI, as is the case in the example GUI shown in FIG. 7.

Referring now to FIG. 3, the storage 206 stores executable code 300. When executed by the processor 200, the executable code 300 causes the processor 200 to perform some or all of the actions attributed herein to the processor 200 and/or to the electronic device 122. In examples, the executable code 300 causes the processor 200 to receive an image of a meeting space having a person, as described above with reference to executable code 210. The processor 200 may compare a face of the person to a database (e.g., database 208) to determine whether the person is relevant to a meeting (e.g., whether the person is a POI). For example, the processor 200 may compare the face to multiple facial images stored in the database 208 to determine whether the person is, for instance, a well-known executive or other leader within the organization. For example, if the processor 200 finds a matching facial image in the database 208, the processor 200 may use metadata associated with the matching facial image to determine who the person is and whether the person is a POI.

The processor 200 may, responsive to the comparison indicating the person is relevant to the meeting (e.g., is a POI), cause a change in a manner in which a video stream of the person is displayed on a GUI. For example, the video stream of the person may be prioritized as described above with reference to FIGS. 5-7. However, responsive to the comparison failing to indicate the person is relevant to the meeting (e.g., the person is a non-POI), the processor 200 may use a machine learning technique (e.g., a convolutional neural network (CNN) trained with a dataset of Fortune 500 executives) on the image to identify facial features of the person signifying relevance traits and determine whether the person is relevant to the meeting based on the identification. For example, the processor 200 may attempt to determine whether the person is a leader based on facial features typical of leaders, as described above. Based on the determination, the processor 200 may cause a change in the manner in which the video stream of the person is displayed on the graphical user interface (GUI), as described above with reference to FIGS. 5-7.

Referring now to FIG. 4, the storage 206 stores executable code 400. When executed by the processor 200, the executable code 400 causes the processor 200 to perform some or all of the actions attributed herein to the processor 200 and/or to the electronic device 122. In examples, the executable code 400 causes the processor 200 to perform a first identification of traits in a face of a person based on an audio-video stream of the person. For example, the processor 200 may perform a machine-learning technique as described above to determine whether a person is a POI, such as a leader. The processor 200 may perform a second identification of traits in a speech of the person based on the audio-video stream. For example, the processor 200 may analyze the person's speech using machine learning techniques (e.g., an algorithm that analyzes the combination of who is speaking the most and/or whose name is referenced most often alongside other identifiers such as a CNN recognizing that the person's mouth is moving and therefore speaking; a machine learning pipeline detecting faces first, then for each face detected, use of a classifier to detect whether a face is speaking or not, then using only the speaking faces and applying clustering (e.g., k-means) to obtain a list with information indicating the number of frames in which each attendee spoke, and identifying the one speaking the most as POIs) to identify a frequency of speech and/or content that indicates the person is a POI (e.g., attendees referring to the person as "sir" or "madam;" attendees frequently agreeing with the person). The processor 200 may determine whether the person is relevant to the meeting based on the first and second identifications, and the processor 200 may prioritize display of the person in a graphical user interface based on the determination, for example as described above with reference to FIGS. 5-7.

In examples, the processor 200 uses a scoring process to determine whether a person is a POI based on the various audio and video analyses described above. For example, the processor 200 may compare an image of a person to images in the database 208 to determine whether a match is found and, if so, what metadata can be collected about the person, whether from the database 208 or from a network connection to, e.g., the Internet. Based on this analysis, the processor 200 may produce a first numerical score. The processor 200 may use machine learning techniques on an image and/or video of the person to determine the likelihood the person is a POI, and may produce a second numerical score accordingly. The processor 200 may identify frequency of speech to produce a third numerical score. The processor 200 may use machine learning techniques to analyze speech content to determine the likelihood the person is a POI and produce a fourth numerical score. The processor 200 may weight each of the multiple numerical scores as desired and produce a final combined score. The processor 200 may compare the final combined score to a threshold. If the final combined score exceeds the threshold, the processor 200 treats that person as a POI, and if the final combined score does not exceed the threshold, the processor 200 treats that person as a non-POI.

The above description is meant to be illustrative of the principles and various examples of the present disclosure.

Numerous variations and modifications will become apparent to those skilled in the art once the above disclosure is fully appreciated. It is intended that the following claims be interpreted to embrace all such variations and modifications.

What is claimed is:

1. An electronic device, comprising:
a processor to:
receive multimodal content associated with a meeting space, the multimodal content comprising image data, audio data or video data;
identify, in the multimodal content, a behavioral trait of a person present in the meeting space;
apply, to the multimodal content, a machine learning model trained on behavioral profiles of individuals labeled as leaders;
perform, by the machine learning model, a comparison between the behavioral trait and the behavioral profiles;
determine, based on the comparison, whether the person is a leader of a meeting; and
based on a comparison of the facial feature, a gesture, and a speech pattern of the person with facial features, gestures, and speech patterns of leaders,
modify, based on the determination, a manner in which of the person is displayed presented on a graphical user interface (GUI).

2. The electronic device of claim 1, wherein the processor is to prioritize, based on a relevance ranking determined from the multimodal content, display of a next most relevant participant in the meeting.

3. The electronic device of claim 1, wherein the processor is to display, on the GUI, only those people identified as leaders of the meeting.

4. The electronic device of claim 1, wherein the processor is to calculate a confidence score based on identifying of the behavioral trait of the person.

5. The electronic device of claim 4, wherein the processor is to compare the confidence score to a threshold to determine whether the person is of relevance to the meeting.

6. The electronic device of claim 1, wherein the processor is to compare a facial representation of the person to a database to determine whether the person is the leader.

7. The electronic device of claim 1, wherein the processor is to compare a speech of the person to a database to determine whether the person is the leader.

8. The electronic device of claim 1, wherein the processor is to apply a second machine learning model to a speech pattern of the person to determine whether the person is of relevance to the meeting.

9. The electronic device of claim 1,
wherein the processor is to calculate a composite score based on identification of facial features speech patterns indicative of leadership, and
wherein the processor is to compare the composite score to a threshold to determine whether the person is the leader.

10. An electronic device, comprising:
a processor to:
receive multimodal content comprising an image and audio data of a meeting space;
compare a facial representation of a person in the meeting space a stored entry in a database to determine whether the person is a leader te-of a meeting based on a match between the facial representation and the stored entry;

wherein responsive to the a comparison of the facial representation indicating that the person is a as the leader, the processor is to:
  modify in real time, a manner in which a video stream of the person is presented on a graphical user interface (GUI);
wherein responsive to the comparison failing to indicate that the person is the leader, the processor is to:
  apply a machine learning model to the multimodal content to identify a behavioral trait of the person, the behavioral trait comprising a facial feature of the person, a gesture made by the person or a speech pattern of the person;
  determine, using the machine learning model, whether the person is the leader based on a comparison of the behavioral trait with behavioral profiles of individuals labeled as leaders; and
  modify, based on the determination, the manner in which the video stream of the person is presented on the GUI; and
wherein the machine learning model is trained on training data comprising images of the individuals, audio recordings of the individuals and gesture data of the individuals.

11. The electronic device of claim 10, wherein responsive to the comparison failing to indicate that the person is the leader, the processor is to prioritize display of the video stream of the person on the GUI over a video stream of another person who is not the leader.

12. The electronic device of claim 10, wherein the processor is to display video streams only of people in the meeting identified as leaders.

13. The electronic device of claim 10, wherein the processor is to prioritize display of a next most relevant person after the person, responsive to the person speaking,
  wherein relevance is determined based on behavioral traits or prior inference of leadership.

14. The electronic device of claim 10, wherein the processor is to display, on the GUI, only persons identified as leaders of the meeting.

15. The electronic device of claim 10, wherein the processor is to compare a face of the person to the stored entry to determine whether the person is a leader of a meeting or a leader in an organization.

16. A non-transitory computer-readable medium storing executable code, which, when executed by a processor, causes the processor to:
  perform a first identification of facial traits of a person in a meeting space based on an audio-video stream of the person;
  perform a second identification of speech traits in a speech of the person based on the audio-video stream;
  determine, using a machine learning model trained on facial and speech traits of individuals labeled as leaders, whether the person is a leader of a meeting by comparing the facial and speech traits of the person with the facial and speech traits of the labeled individuals; and
  prioritize display of the person in a graphical user interface based on the determination,
  wherein the machine learning model is trained on training data comprising facial and speech traits of the labeled individuals.

17. The non-transitory computer-readable medium of claim 16, wherein execution of the executable code causes the processor to compare the speech traits to a database to determine whether the person is the leader.

18. The non-transitory computer-readable medium of claim 16, wherein execution of the executable code causes the processor to compare the facial traits of the person to a database to determine whether the person is the leader.

19. The non-transitory computer-readable medium of claim 16, wherein execution of the executable code causes the processor to prioritize display of another person relevant to the meeting responsive to the person speaking.

20. The non-transitory computer-readable medium of claim 16, wherein execution of the executable code causes the processor to calculate a score based on the first and second identifications and to compare the score to a threshold to determine whether the person is a leader to the meeting.

21. The electronic device of claim 1, wherein the behavioral trait comprises:
  a facial feature of the person,
  a gesture made by of the person, or
  a speech pattern of the person.

22. The electronic device of claim 1, wherein the behavioral profiles comprise:
  a facial feature of any of the individuals,
  a gesture made by any of the individuals, or
  a speech pattern of any of the individuals.

* * * * *